United States Patent
Barr et al.

(10) Patent No.: US 12,176,694 B2
(45) Date of Patent: Dec. 24, 2024

(54) ELECTRICAL OUTLET ASSEMBLY

(71) Applicant: Norman R. Byrne, Ada, MI (US)

(72) Inventors: Roger J. Barr, Ada, MI (US); Derrick C. Yager, Rockford, MI (US); Daniel P. Byrne, Lowell, MI (US)

(73) Assignee: Norman R. Byrne, Ada, MI (US)

( * ) Notice: Subject to any disclaimer, the term of this patent is extended or adjusted under 35 U.S.C. 154(b) by 249 days.

(21) Appl. No.: 17/966,354

(22) Filed: Oct. 14, 2022

(65) Prior Publication Data
US 2023/0124858 A1 Apr. 20, 2023

Related U.S. Application Data

(60) Provisional application No. 63/256,412, filed on Oct. 15, 2021.

(51) Int. Cl.
*H02G 3/08* (2006.01)
*H01R 25/00* (2006.01)
*H02G 3/14* (2006.01)

(52) U.S. Cl.
CPC ........... *H02G 3/083* (2013.01); *H01R 25/006* (2013.01); *H02G 3/14* (2013.01)

(58) Field of Classification Search
None
See application file for complete search history.

(56) References Cited

U.S. PATENT DOCUMENTS

| | | | |
|---|---|---|---|
| 1,300,265 A | 4/1919 | Handley | |
| 1,909,270 A | 5/1933 | Guett | |
| 3,005,179 A | 10/1961 | Holt | |
| 3,315,219 A | 4/1967 | Brinser | |
| 3,349,363 A | 10/1967 | Goodman | |
| 3,851,226 A | 11/1974 | Chen | |
| 4,193,660 A | 3/1980 | Jaconette | |
| 4,340,772 A * | 7/1982 | Bose ...................... | H02G 3/16 |
| | | | 174/66 |
| 4,350,839 A * | 9/1982 | Lass ...................... | H02G 3/065 |
| | | | 174/661 |
| 4,818,822 A * | 4/1989 | Yahraus ................. | H02G 3/083 |
| | | | 220/4.24 |
| 4,934,962 A | 6/1990 | Luu et al. | |
| 5,122,069 A | 6/1992 | Brownlie et al. | |
| D367,038 S | 2/1996 | Fladung et al. | |
| 5,503,565 A | 4/1996 | McCoy | |
| D367,643 S | 5/1996 | Vardell | |

(Continued)

*Primary Examiner* — Krystal Robinson
(74) *Attorney, Agent, or Firm* — Gardner, Linn, Burkhart & Ondersma LLP (57) ABSTRACT

An electrical outlet has a housing including a perimeter housing portion sandwiched between front and rear housing portions. The perimeter housing portion define an interior and has a front edge and a rear edge. The front housing portion has a rear surface that engages the front edge of the perimeter housing portion, and the front housing portion includes one or more electrical receptacle openings to the interior, with a plurality of rearwardly-extending latch tabs for securing the electrical outlet to a mounting surface. The rear housing portion has a front surface that engages the rear edge of the perimeter housing portion. The rear and perimeter housing portions cooperate to define a strain relief for an electrical cord that supplies power to electrical contacts inside the housing.

20 Claims, 14 Drawing Sheets

(56) References Cited

U.S. PATENT DOCUMENTS

| | | |
|---|---|---|
| 5,516,298 A | 5/1996 | Smith |
| 5,556,308 A | 9/1996 | Brown et al. |
| 5,575,668 A | 11/1996 | Timmerman |
| 6,220,880 B1 | 4/2001 | Lee et al. |
| 6,492,591 B1 | 12/2002 | Metcalf |
| 6,740,810 B1 | 5/2004 | Regueiro |
| 6,793,524 B2 | 9/2004 | Clark et al. |
| 6,830,477 B2 | 12/2004 | Vander Vorste et al. |
| 6,910,913 B1 | 6/2005 | Satern |
| 6,929,514 B1 | 8/2005 | Chuang |
| D535,257 S | 1/2007 | Byrne |
| D537,039 S | 2/2007 | Pincek |
| 7,183,483 B1 * | 2/2007 | Anderson ............... H02G 3/14 |
| | | 439/535 |
| D537,785 S | 3/2007 | Pincek |
| D568,817 S | 5/2008 | Yu |
| 7,432,439 B2 | 10/2008 | Takada et al. |
| D622,219 S | 8/2010 | Byrne |
| D626,069 S | 10/2010 | Byrne |
| D626,070 S | 10/2010 | Byrne |
| D626,071 S | 10/2010 | Byrne |
| D636,728 S | 4/2011 | Terleski et al. |
| D639,244 S | 6/2011 | Byrne |
| D642,529 S | 8/2011 | Su et al. |
| 8,033,867 B1 | 10/2011 | Kessler et al. |
| D649,514 S | 11/2011 | Byrne |
| D653,215 S | 1/2012 | Lam |
| D660,237 S | 5/2012 | Byrne |
| D665,355 S | 8/2012 | Byrne |
| D666,556 S | 9/2012 | Byrne |
| 8,277,233 B2 | 10/2012 | Su |
| D673,912 S | 1/2013 | Benedetti |
| D680,953 S | 4/2013 | Kuo |
| D682,213 S | 5/2013 | Byrne et al. |
| D682,789 S | 5/2013 | Au |
| 8,444,432 B2 | 5/2013 | Byrne et al. |
| 8,480,429 B2 | 7/2013 | Byrne et al. |
| D693,306 S | 11/2013 | Chuang et al. |
| D695,693 S | 12/2013 | Lee et al. |
| D698,314 S | 1/2014 | Byrne et al. |
| 8,625,255 B2 | 1/2014 | Linnane et al. |
| 8,690,590 B2 | 4/2014 | Byrne |
| 8,736,106 B2 | 5/2014 | Byrne et al. |
| 8,758,031 B2 | 6/2014 | Cheng et al. |
| D714,726 S | 10/2014 | Byrne et al. |
| D715,225 S | 10/2014 | Mininger et al. |
| D719,091 S | 12/2014 | Leddusire |
| D721,330 S | 1/2015 | Byrne et al. |
| D721,653 S | 1/2015 | Lee et al. |
| D722,563 S | 2/2015 | Byrne et al. |
| 9,000,298 B2 | 4/2015 | Byrne et al. |
| D730,834 S | 6/2015 | Byrne et al. |
| D730,836 S | 6/2015 | Lee et al. |
| D736,159 S | 8/2015 | Byrne et al. |
| D736,709 S | 8/2015 | Byrne et al. |
| D739,355 S | 9/2015 | D'Aubeterre |
| D740,228 S | 10/2015 | Page et al. |
| D740,229 S | 10/2015 | Page et al. |
| D744,951 S | 12/2015 | Oosterman et al. |
| 9,246,317 B2 | 1/2016 | Byrne et al. |
| D751,038 S | 3/2016 | Lin |
| D752,517 S | 3/2016 | Scott et al. |
| 9,312,653 B2 | 4/2016 | Byrne et al. |
| 9,312,673 B2 | 4/2016 | Byrne et al. |
| D755,128 S | 5/2016 | Page et al. |
| D755,129 S | 5/2016 | Page et al. |
| 9,368,924 B2 | 6/2016 | Byrne et al. |
| D765,033 S | 8/2016 | Oosterman et al. |
| 9,425,570 B2 | 8/2016 | Oosterman et al. |
| D755,077 S | 12/2016 | Xu |
| D775,080 S | 12/2016 | Newhouse |
| D775,589 S | 1/2017 | Soffer et al. |
| D776,056 S | 1/2017 | Block et al. |
| 9,601,860 B2 | 3/2017 | Byrne et al. |
| 9,627,873 B2 | 4/2017 | Makwinski et al. |
| D788,039 S | 5/2017 | Page et al. |
| 9,640,960 B2 | 5/2017 | Makwinski et al. |
| 9,661,768 B2 | 5/2017 | Haw |
| 9,706,833 B2 | 7/2017 | Newhouse |
| 9,755,385 B1 | 9/2017 | Kondas |
| D798,818 S | 10/2017 | Kondas |
| D799,428 S | 10/2017 | Kondas |
| D801,276 S | 10/2017 | Lin |
| D801,937 S | 11/2017 | Rose |
| D801,963 S | 11/2017 | Rose |
| D804,419 S | 12/2017 | Hayes et al. |
| D807,297 S | 1/2018 | Byrne et al. |
| D807,298 S | 1/2018 | Xu |
| D807,829 S | 1/2018 | Byrne et al. |
| D807,831 S | 1/2018 | Xu |
| D808,339 S | 1/2018 | Page et al. |
| D811,337 S | 2/2018 | Byrne et al. |
| D811,338 S | 2/2018 | Zhu |
| 9,887,500 B2 | 2/2018 | Riner |
| D812,009 S | 3/2018 | Hayes et al. |
| 10,008,816 B2 | 6/2018 | Byrne et al. |
| 10,367,317 B1 * | 7/2019 | Rahner ............... H01R 25/003 |
| 10,673,191 B2 | 6/2020 | Byrne et al. |
| 10,720,795 B2 | 7/2020 | Byrne et al. |
| 10,811,809 B2 | 10/2020 | Byrne et al. |
| 10,873,167 B2 | 12/2020 | Byrne |
| 10,965,049 B2 | 3/2021 | Byrne et al. |
| 11,251,562 B2 | 2/2022 | Byrne et al. |
| 11,424,561 B2 | 8/2022 | Byrne et al. |
| 2002/0154528 A1 | 10/2002 | Ravid |
| 2004/0121648 A1 | 6/2004 | Voros |
| 2007/0068940 A1 * | 3/2007 | Gates ............... H01R 25/006 |
| | | 220/3.94 |
| 2007/0181328 A1 * | 8/2007 | Dinh ............... H02G 3/121 |
| | | 174/50 |
| 2010/0317223 A1 | 12/2010 | Byrne |
| 2012/0009820 A1 | 1/2012 | Byrne |
| 2013/0280956 A1 | 10/2013 | Cheng et al. |
| 2014/0213093 A1 | 7/2014 | Tal et al. |
| 2015/0303821 A1 | 10/2015 | Lee et al. |
| 2016/0141973 A1 | 5/2016 | Abdalla et al. |
| 2017/0310061 A1 * | 10/2017 | Riner ............... H01R 13/743 |

\* cited by examiner

ELECTRICAL OUTLET ASSEMBLY

CROSS REFERENCE TO RELATED APPLICATIONS

The present invention claims the benefit of U.S. provisional application Ser. No. 63/256,412, filed Oct. 15, 2021, which is hereby incorporated by reference in its entirety.

FIELD OF THE INVENTION

The present invention relates to electrical power destruction systems for use in work areas and the like.

BACKGROUND OF THE INVENTION

Electrical power outlets are commonly desired in different locations of rooms including work areas, dwelling spaces, and public areas such as airport. Some such areas are reconfigured from time to time, such as to accommodate a different group of workers or work types, and therefore may be supplied with modular electrical power systems that are easily taken apart and reconfigured for new configurations or needs.

SUMMARY OF THE INVENTION

The present invention provides an electrical power outlet that is readily installed at an opening formed in a wall surface or similar environment or mounting surface, without use of tools, and which is also readily removable from the mounting surface. The electrical power outlet typically provides users of a work area with access to high voltage AC electrical power outlets (e.g. 110V or 220V) and/or low voltage DC electrical power outlets (e.g., 2V DC to 12V DC), and optionally with access to electronic data outlets. The electrical or electronic outlets may be installed without need for tools, and may even be removed without tools, or with only a basic tool such as a screwdriver, and without exposing electrical contacts of the outlet.

In one form of the present invention, an electrical outlet has a three-part housing made up of perimeter housing portion that is sandwiched between front and rear housing portions. The perimeter housing portion defines an interior. The front housing portion has a rear surface that engages a front edge of the perimeter housing portion, while the rear housing portion has a front surface that engages a rear edge of the perimeter housing portion. The front housing portion includes one or more electrical receptacle openings to the interior, with a plurality of rearwardly-extending latch tabs for securing the electrical outlet to a mounting surface. The rear and perimeter housing portions cooperate to define a strain relief for an electrical power cord that supplies power to electrical contacts inside the housing.

In another form of the present invention, an electrical outlet includes a perimeter housing portion, a front housing portion, a rear housing portion, and a plurality of electrical bus bars. The perimeter housing portion defines an interior, a front edge, and a rear edge. The front housing portion has a rear surface configured for engagement with the front edge of the perimeter housing portion, the front housing portion defining a plurality of electrical receptacle openings to the interior. The rear housing portion has a front surface configured to be engaged with the rear edge of the perimeter housing portion. The electrical bus bars are supported between the front and rear housing portions, and each has an electrical contact aligned with a respective electrical receptacle opening. The rear housing portion has a plurality of forwardly-extending walls and posts for supporting the plurality of electrical bus bars in alignment with the electrical openings, and in electrical isolation from one another. The front housing portion has a plurality of rearwardly-extending walls for supporting the electrical bus bars in alignment with the electrical openings and in electrical isolation from one another.

Therefore, the electrical outlet of the present invention is readily assembled from three housing portions and a plurality of electrical contacts that are supported by various surfaces of the housing portions. The result is a durable electrical outlet assembly that can be readily installed at wall openings and that resists damage and wear caused by rough usage. The electrical outlet may be configured for different styles of electrical plugs by changing the electrical bus bars and the front housing portion.

These and other objects, advantages, purposes and features of the present invention will become apparent upon review of the following specification in conjunction with the drawings.

DESCRIPTION OF THE PREFERRED EMBODIMENTS

Figure 1:
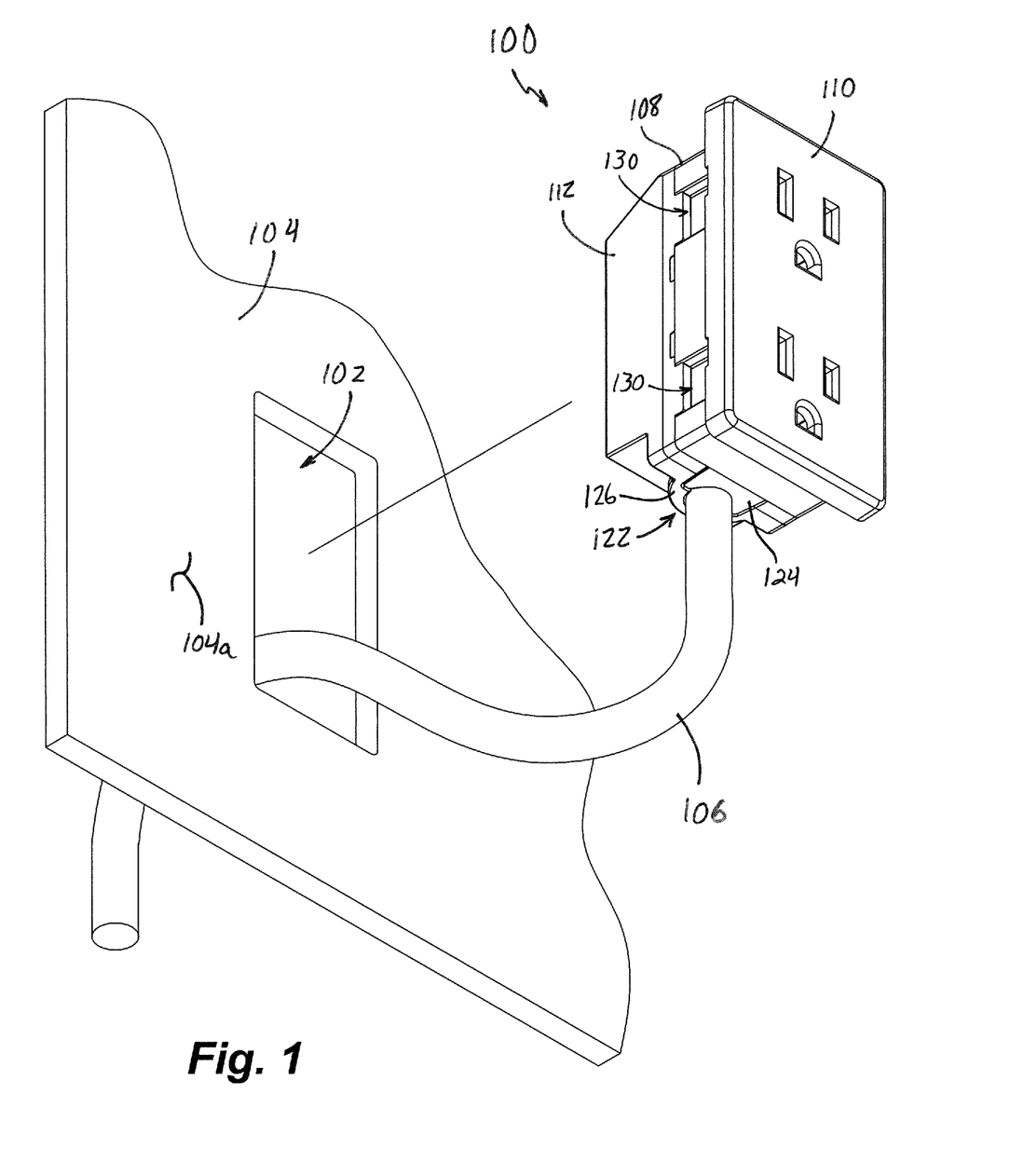
FIG. 1 is a lower-front perspective view of an electrical outlet assembly in accordance with the present invention, shown being installed at an opening in a wall surface.
Figure 2:
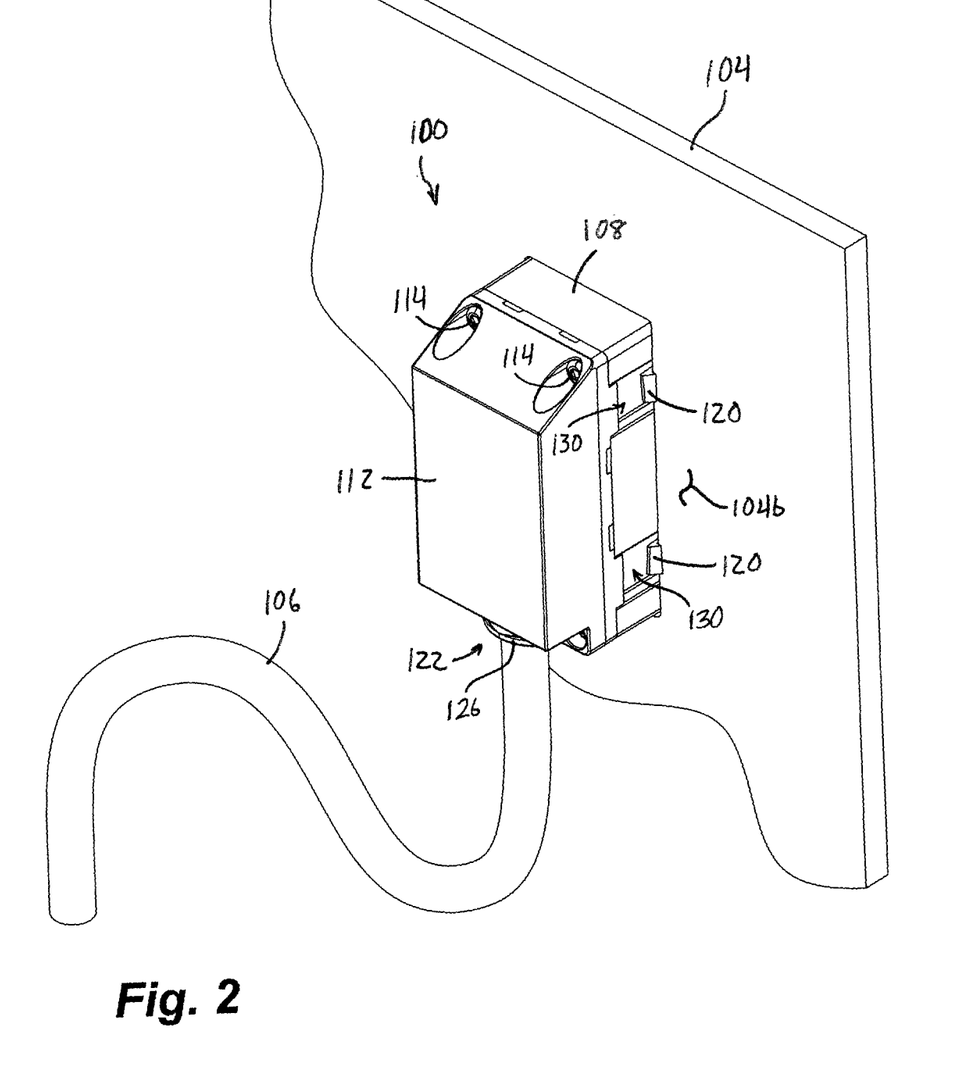
FIG. 2 is an upper-rear perspective view of the electrical outlet assembly of FIG. 1, shown installed at the wall surface.
Figure 3:
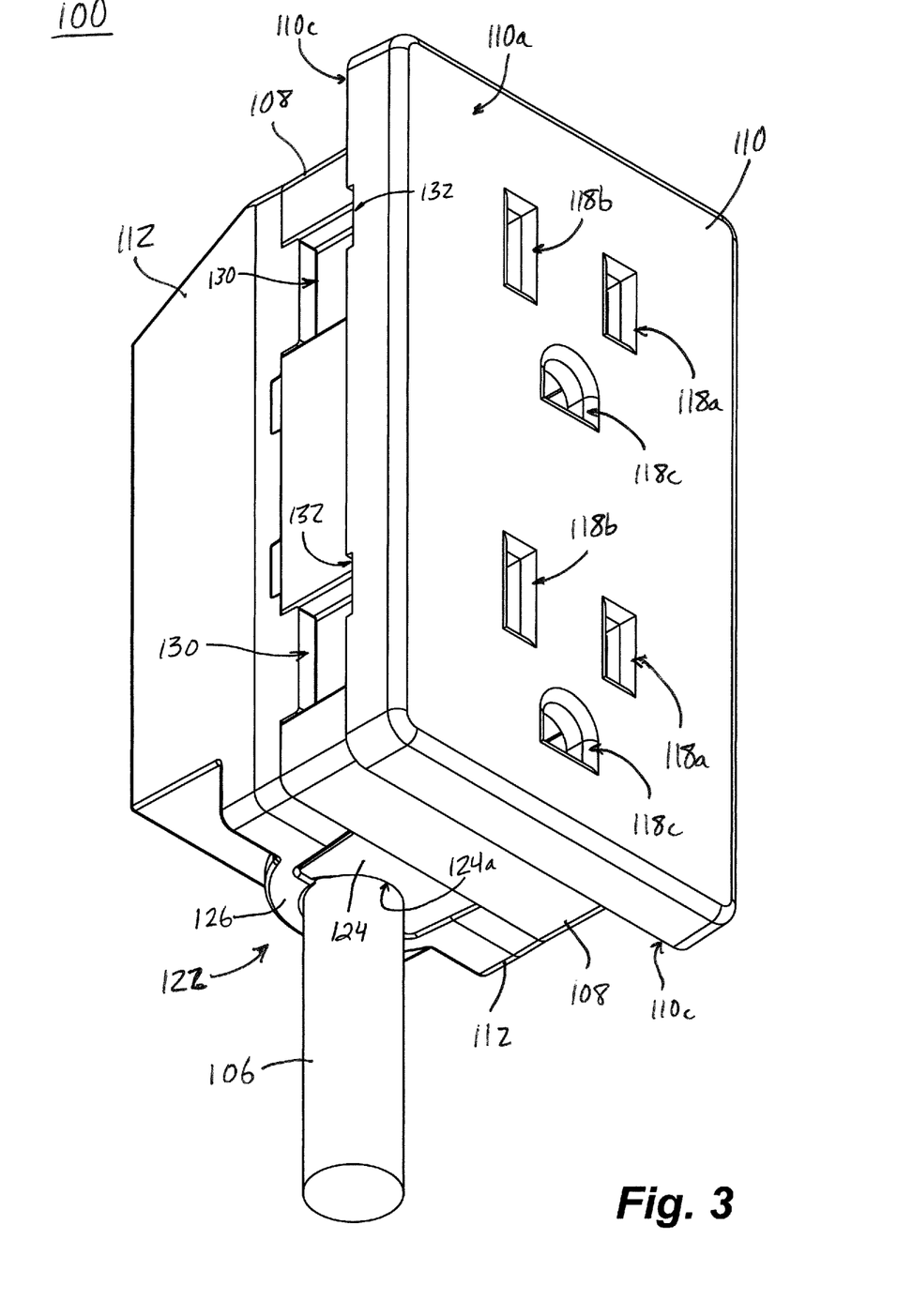
FIG. 3 is another lower-front perspective view of the electrical outlet assembly.

Referring now to the drawings and the illustrative embodiments depicted therein, an electrical outlet 100 is provided for mounting directly at an opening 102 formed in a wall panel 104 or other mounting surface (FIGS. 1 and 2). The electrical outlet 100 does not require installation at a separate mounting box, and has its own built-in structure for securing the outlet at the opening 102, as will be described in more detail below. An electrical cord 106 provides power to outlet 100, and can be passed through the opening 102 prior to securing the outlet, such as show in FIG. 2. Electrical outlet 100 may be particularly well suited for use with modular electrical systems that are routed through non-structural walls to provide access to electrical power and/or data connections throughout a room or work area, as an opposite end of cord 106 may optionally be fitted with a modular electrical connector, although hard-wired applications are also envisioned. It will be appreciated that electrical cord 106 is representative of substantially any cord with electrical transmission capability, ranging from high voltage AC power to low voltage DC power, or even electronic data signals, so that the associated electrical outlet may accommodate any one or more of these types of receptacles.

Electrical outlet 100 includes a perimeter housing portion 108, a front housing portion 110, and a rear housing portion 112, which are secured together using a plurality of fasteners 114, such as shown in FIGS. 2 and 6-8. Perimeter housing portion 108 defines an interior 116 (FIGS. 7-10, 19, and 20), which is enclosed by front housing portion 110 and rear housing portion 112. Perimeter housing portion 108 has a front edge portion 108a that engages a rear surface 110b of front housing portion 110, and a rear edge portion 108b that engages a forward surface 112a of rear housing portion 112. Front housing portion 110 acts as a face plate of the electrical outlet 100 and defines a plurality of receptacle openings which, in the illustrated embodiment, include two line contact openings 118a, two neutral contact openings 118b, and two ground contact openings 118c (FIGS. 1, 3, 5, and 7). Front housing portion 110 has a front surface 110a and further includes four rearwardly-extending latch tabs 120 having ramped or sloped tip portions 120a to facilitate insertion into opening 102, and ledge portions 120b for engaging mounting surface 104 at opening 102 to secure electrical outlet 100 to mounting surface 104, such as shown in FIGS. 2, 4, 6, 8, 10, and 15-18.

Figure 8:
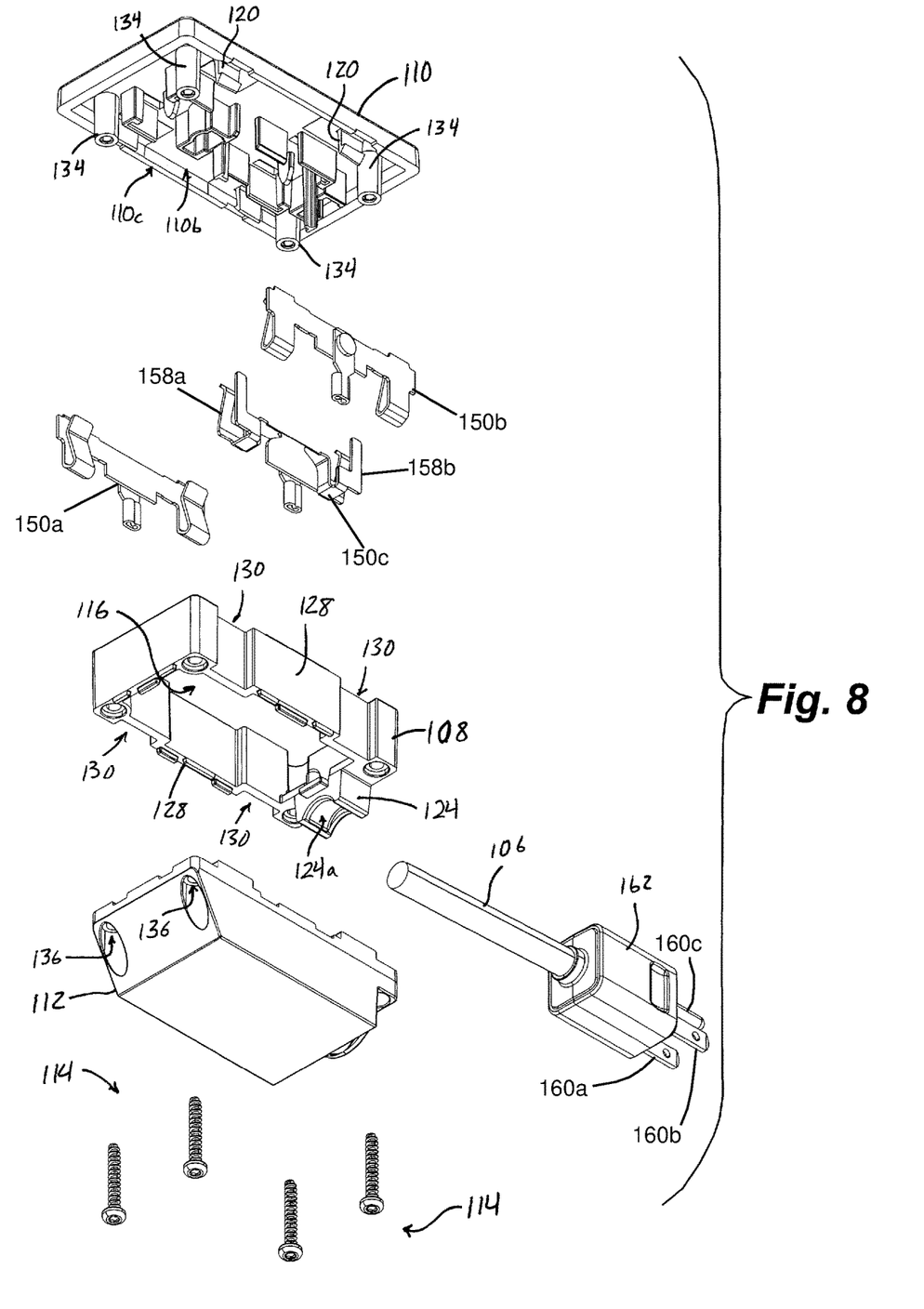
FIG. 8 is a rear exploded perspective view of the electrical outlet assembly.
Figure 9:
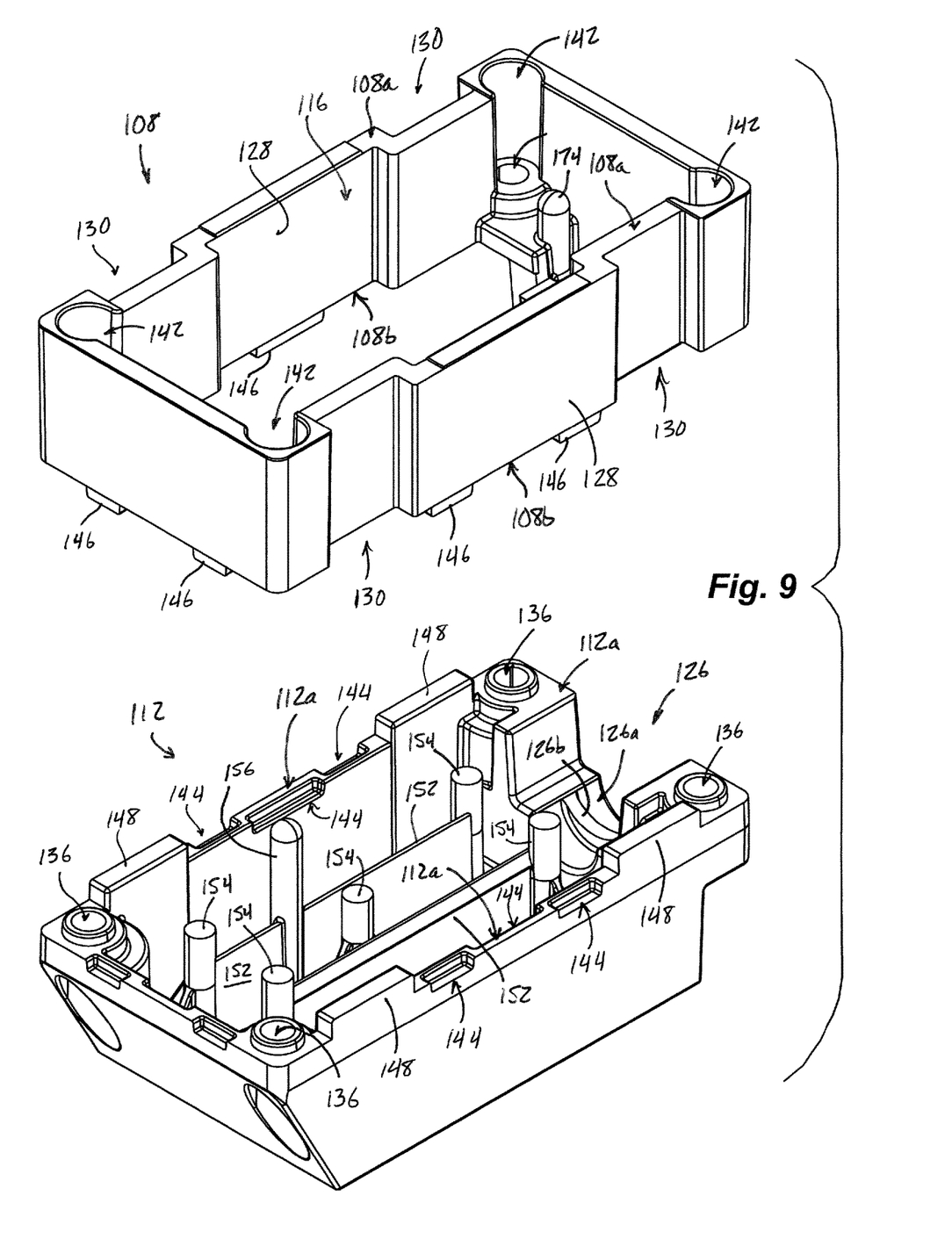
FIG. 9 is a front exploded perspective view of a perimeter housing piece and rear housing piece of the electrical outlet assembly.
Figure 10:
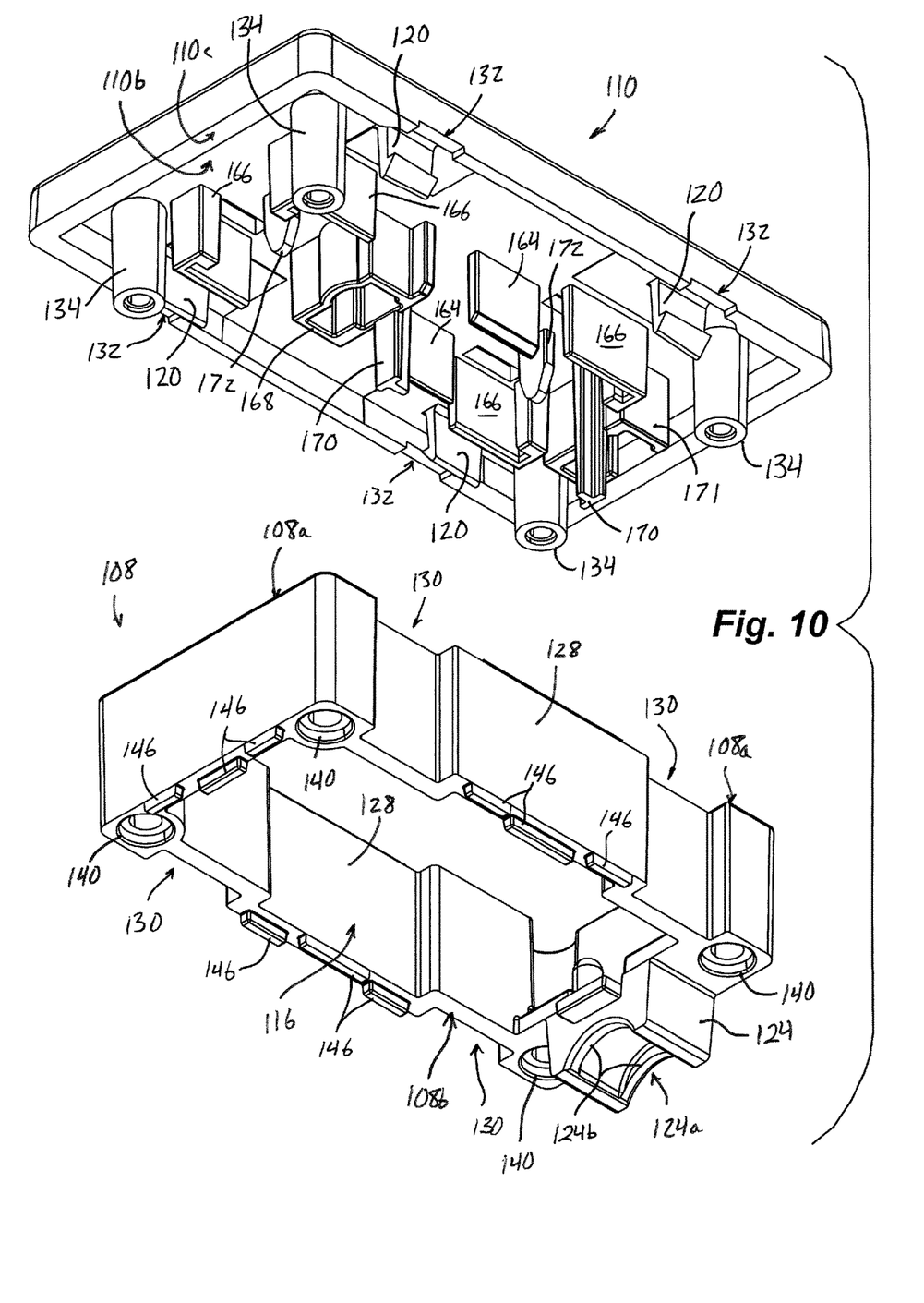
FIG. 10 is a rear exploded perspective view of a front housing piece and the rear perimeter housing piece of the electrical outlet assembly.
Figure 11:
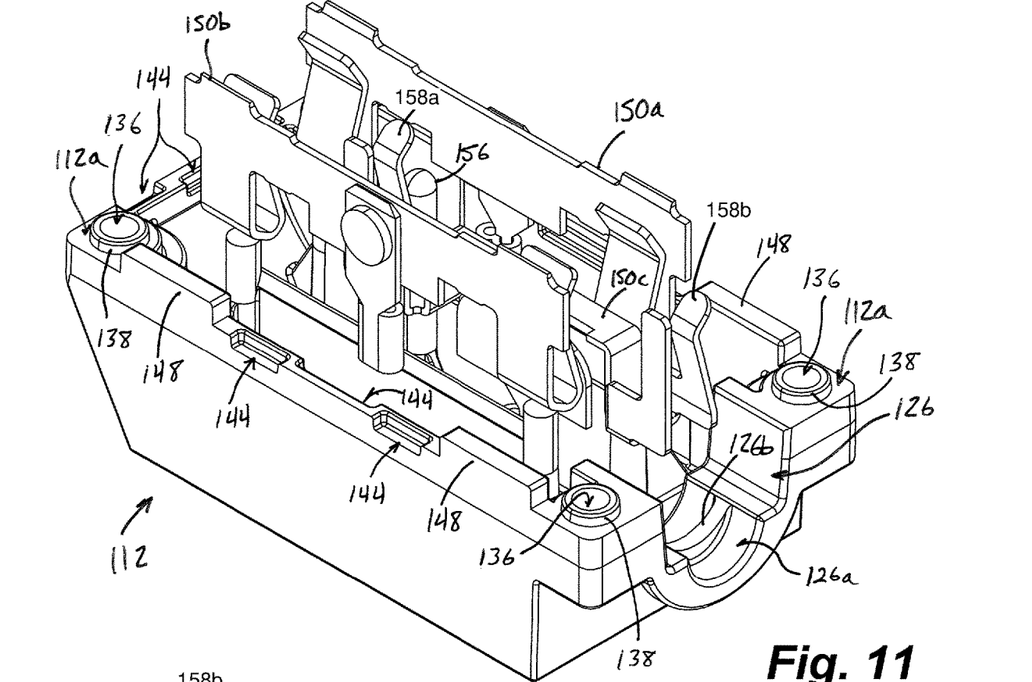
FIG. 11 is a lower-front perspective view of the rear housing piece with electrical contacts fitted.
Figure 19:
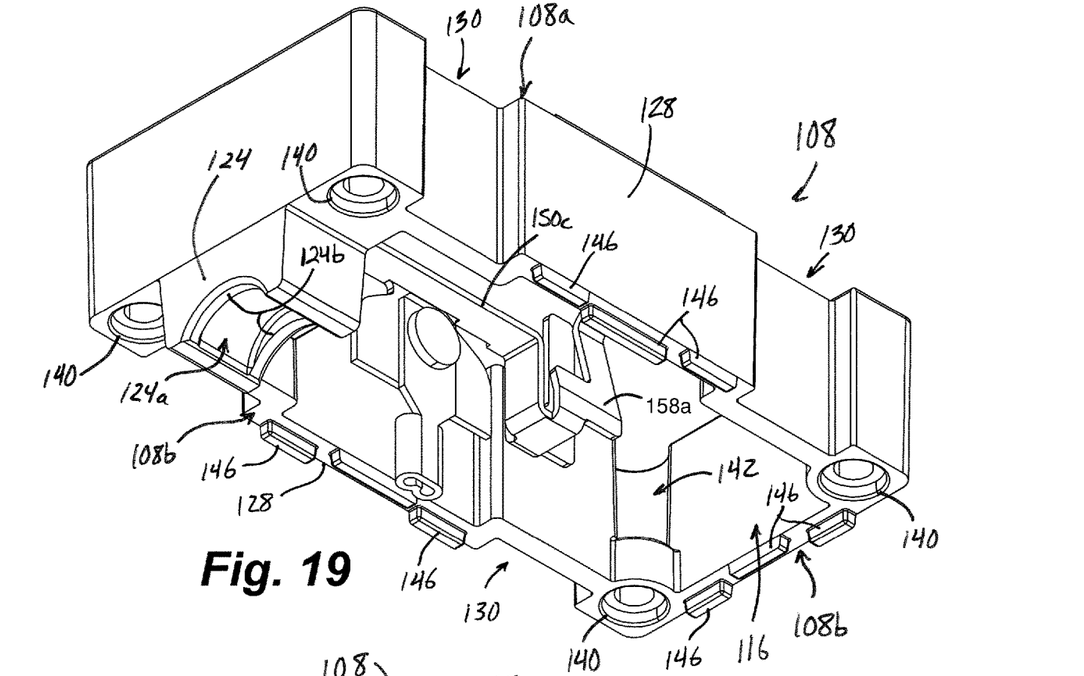
FIG. 19 is a lower-rear perspective view of the perimeter housing piece with ground contact fitted.

Rear housing portion 112 and perimeter housing portion 108 cooperate to define respective portions of a strain relief 122 that engages and secures electrical power cord 106 where it enters the interior 116 from an exterior of the electrical outlet, such as shown in FIG. 2. Strain relief 122 includes a strain relief projection 124 that extends rearwardly from the rear edge 108b of the perimeter housing portion 108, such as shown in FIGS. 3, 4, 8, 10, and 19. As best shown in FIGS. 8, 10, and 19, strain relief projection 124 has an arcuate recess 124a at its rear end region, with two spaced-apart cord-engaging ridges 124b along the recess 124a. Another part of strain relief 122 includes a strain relief recess 126 that extends rearwardly from the rear housing portion's front surface 112a, such as shown in FIGS. 4, 7, 9, and 11-14. As best shown in FIGS. 9, 11, and 13, strain relief recess 126 has an arcuate recess 126a at its rear end region, with one central cord-engaging ridge 126b along the arcuate recess 126a. When perimeter housing portion 108 is assembled to rear housing portion 112 with cord 106 disposed in strain relief 122, strain relief projection 124 is received in strain relief recess 126 so that projection recess 124a cooperates with arcuate recess 126a to form a power cord opening. Central cord-engaging ridge 126b and spaced-apart cord-engaging ridges 124b impinge on an outer casing of cord 106 and hold it secure so that it cannot be accidentally pulled from strain relief 122.

Referring to FIGS. 1-10, 19, and 20, the perimeter housing portion 108 includes a pair of opposing sidewalls 128 each defining a pair of recesses 130 that receive the rearwardly-extending latch tabs 120 from the front housing portion 110. Recesses 130 provide clearance for the latch tabs 120 to flex inboard as ramped surfaces 120a slide along edges of the wall panel 104 that define respective sides of the opening 102. Once the ledge portions 120b reach a rear surface 104b of wall panel 104, latch tabs 120 flex back outwardly (away from sidewalls 128) and engage the wall panel's rear surface 104b as shown in FIG. 2, thereby securing electrical outlet 100 with a back rim or perimeter wall 110c of front housing portion 110 engaged with a front surface 104a of wall panel 104. Back rim 110c includes a small recess 132 that provides a narrow gap between the front surface 104a of wall panel 104 and the rear edge of back rim 110c. A tool, such as the tip of a flat-blade screwdriver, may be inserted into recesses 132 and pushed inwardly against latch tabs 120 to facilitate removal of the outlet 110 from mounting surface 104.

Figure 4:
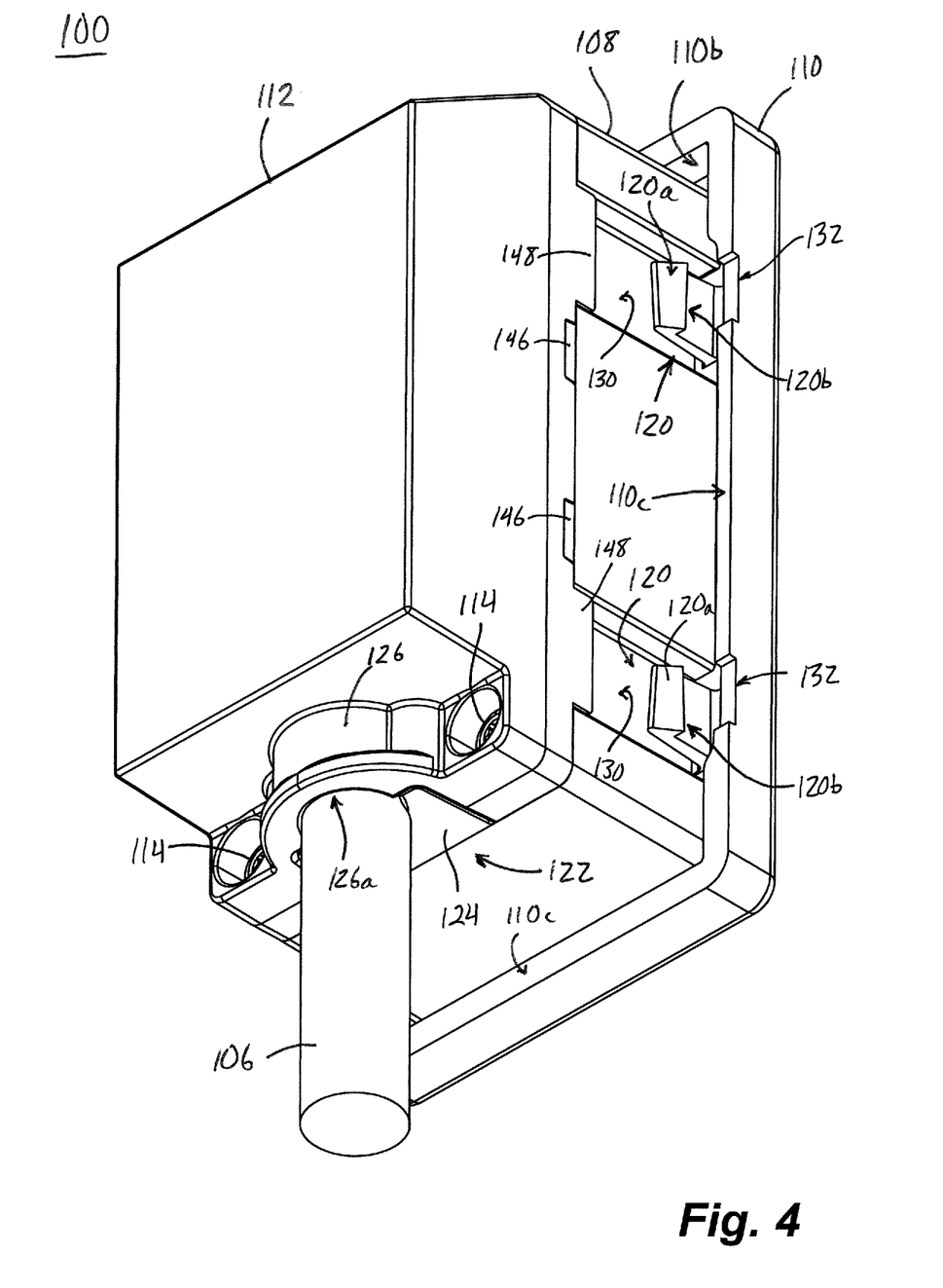
FIG. 4 is a lower-rear perspective view of the electrical outlet assembly.
Figures 5, 6:
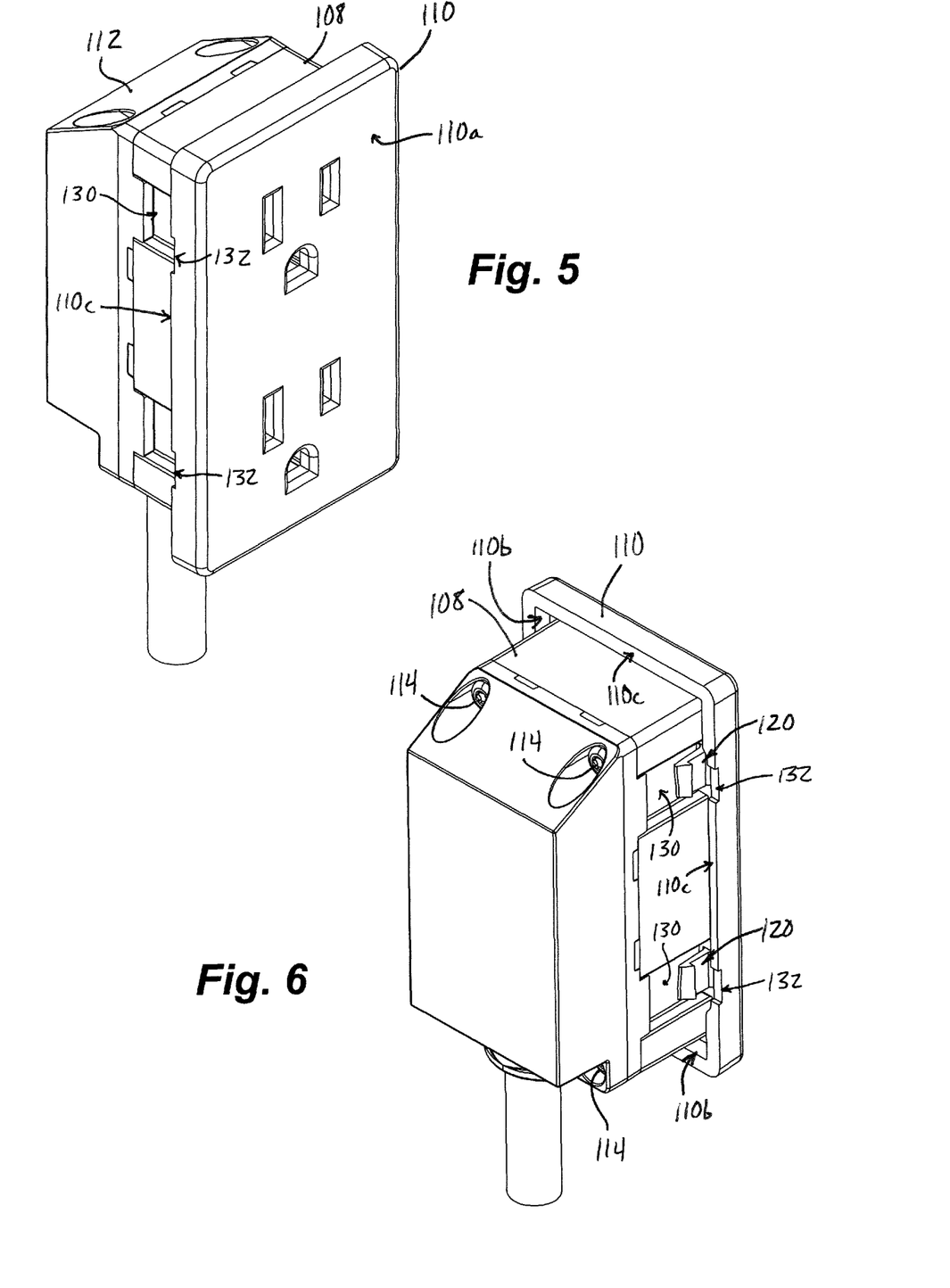
FIG. 5 is an upper-front perspective view of the electrical outlet assembly.
FIG. 6 is an upper-rear perspective view of the electrical outlet assembly.
Figure 7:
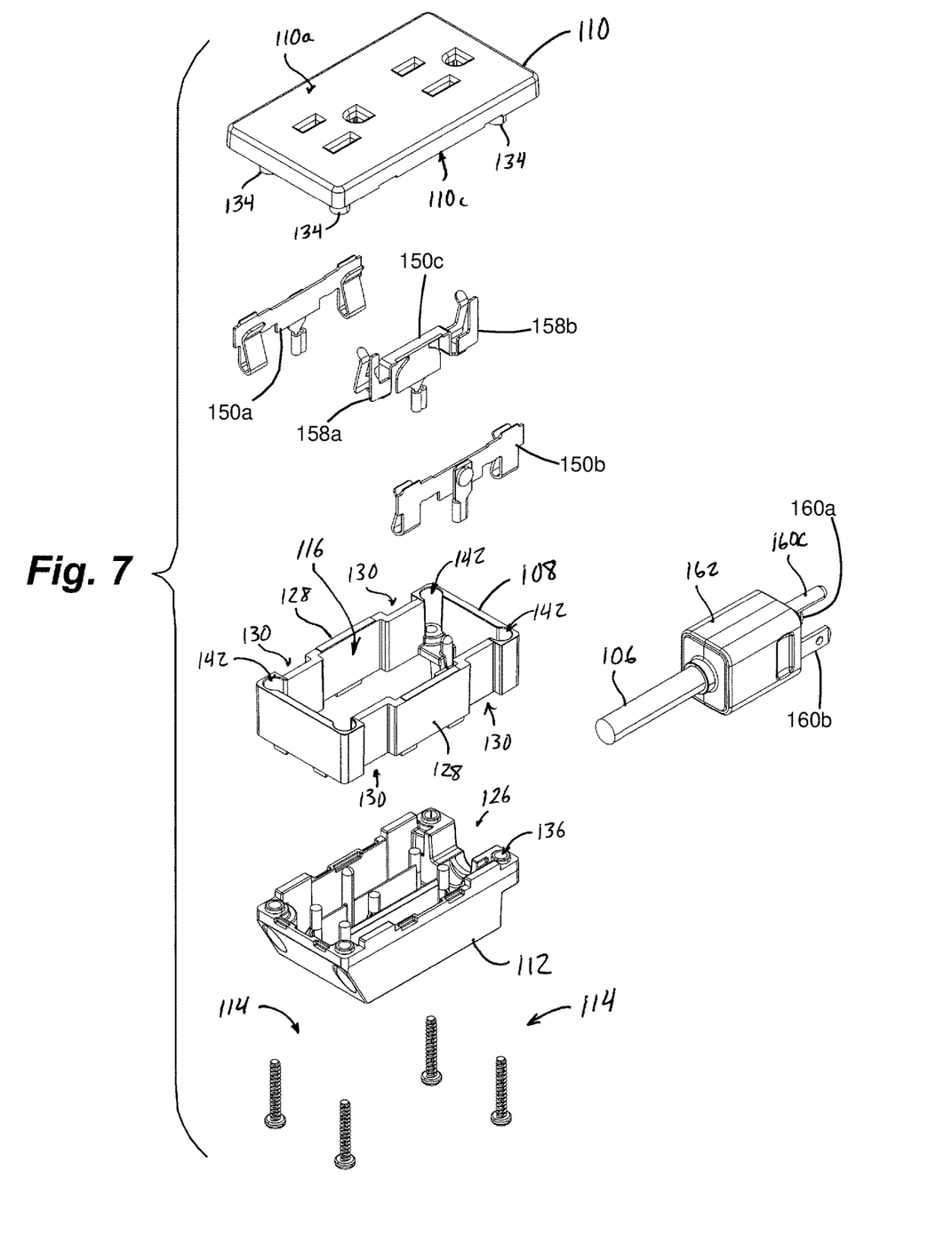
FIG. 7 is a front exploded perspective view of the electrical outlet assembly.

The front housing portion 110 includes tubular screw bosses 134 extending rearwardly into the perimeter housing portion 108 at the four corner regions (FIGS. 8, 10, and 15-18). The rear housing portion 112 defines fastener openings 136 (FIGS. 9 and 11-14) that are aligned with respective screw bosses 134. A forward-extending annular wall 138 surrounds each fastener opening 136 along forward surface 112a of rear housing portion 112, and a corresponding annular recess 140 (FIGS. 9, 10, and 19) is formed in rear surface 108b of perimeter housing portion 108 to receive the respective annular walls 138 and aid in alignment of the perimeter housing portion 108 relative to the rear housing portion 112 during assembly. Perimeter housing portion 108 further defines partial-cylindrical fastener passageways 142 (FIGS. 7, 9, 19, and 20), which are open to interior 116, and which receive respective screw bosses 134 during assembly of front housing portion 110 to perimeter housing portion 108, thus aiding in alignment of those housing portions during assembly. Threaded fasteners 114 pass through fastener openings 136 and into fastener passageways 142, where they threadedly engage inner walls of screw bosses 134, such as in a self-tapping manner. Tightening fasteners 114 causes the fasteners' heads to tighten against rear housing portion 112 as shown in FIGS. 2, 4, and 6, and draws front housing portion 110 tight against perimeter housing portion 108, while also drawing perimeter housing portion 108 tight against rear housing portion 112.

To further aid in the alignment of front housing portion 110 to perimeter housing portion 108, the front edge portion 108a is sized and shaped to abut the front housing portion's rear surface 110b just inboard of back rim 110c, and between screw bosses 134 and back rim 110c in the corner regions. This allows back rim 110c to obscure the edges of opening 102 in the mounting surface 104 when outlet 100 is installed. To further aid in the alignment of perimeter housing portion 108 to rear housing portion 112, the front edge portion 112a of rear housing portion 112 is formed with a plurality of rearward-extending recesses 144 as shown in FIGS. 9 and 11-14, while a corresponding plurality of rearward-extending tabs 146 are formed along rear edge portion 108b of perimeter housing portion 108 as shown in FIGS. 9-14. Recesses 144 align with and receive respective tabs 146 during assembly. Moreover, a pair of forward-extending tabs 148 along the front edge portion 112a of rear housing portion 112 are received in respective recesses 130 of the perimeter housing portion's opposing sidewalls 128 during assembly, providing still further alignment. It will be appreciated that, because of their staggered and interlocking positioning, corresponding tabs 146, 148 and recesses 144, 130 also enhance rigidity of the interface between the perimeter housing portion's rear edge portion 108b and the rear housing portion's front edge portion 112b.

Figure 12:
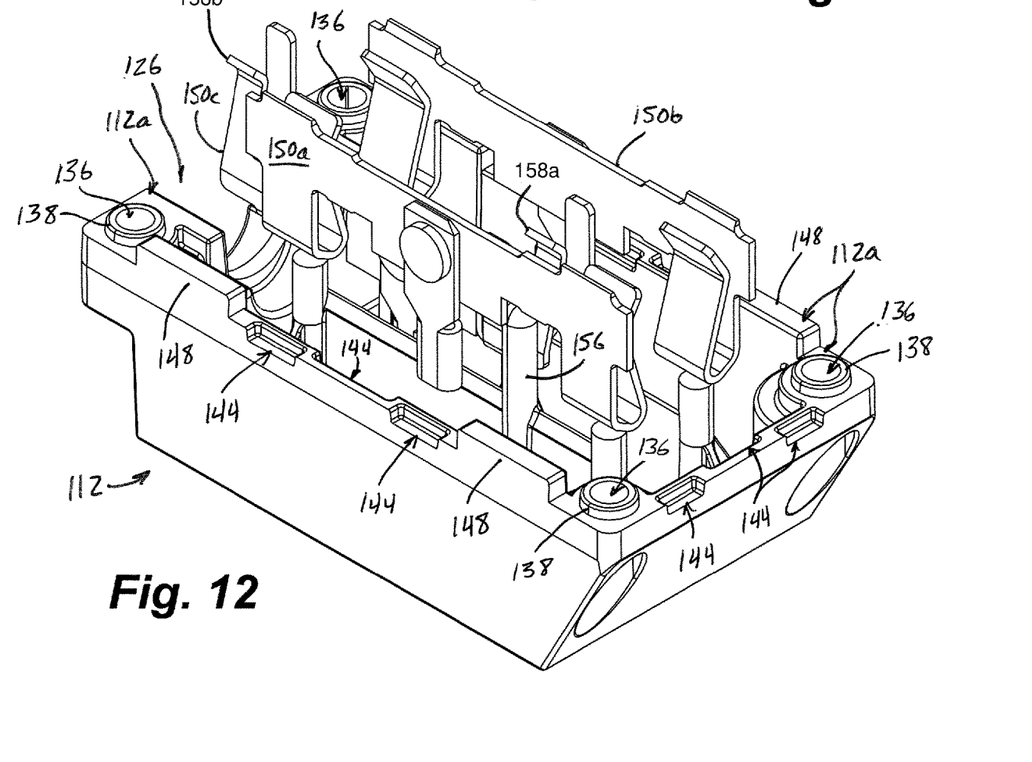
FIG. 12 is an upper-front perspective view of the rear housing piece with electrical contacts fitted.
Figure 13:
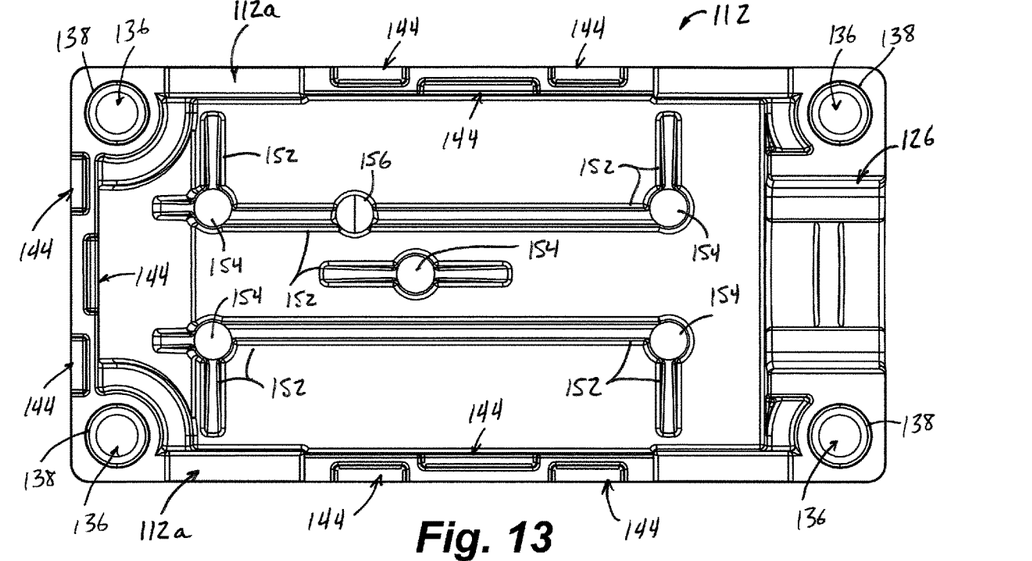
FIG. 13 is a front elevation view of the rear housing piece.
Figure 14:
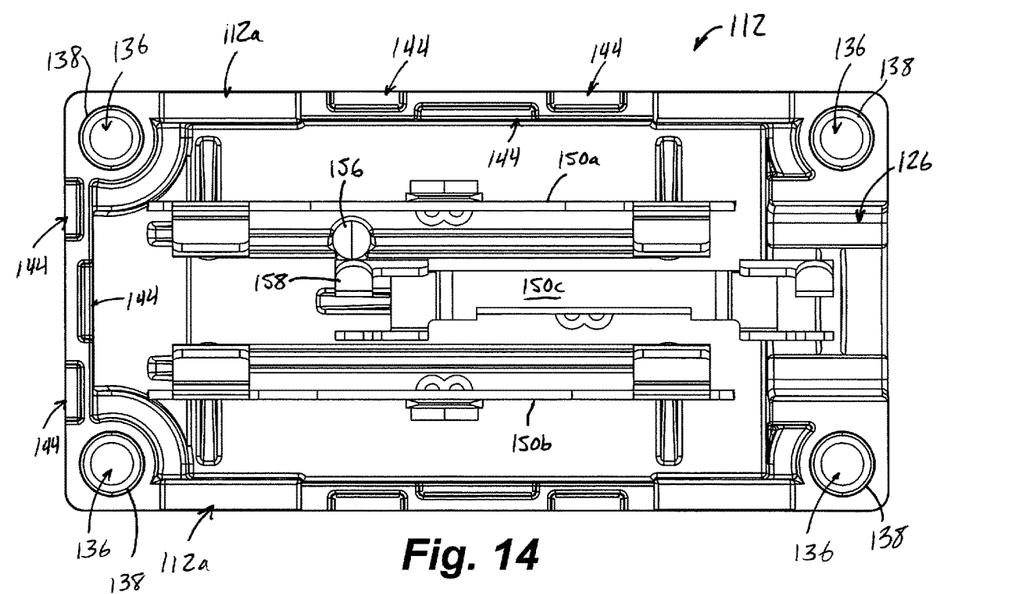
FIG. 14 is a front elevation view of the rear housing piece with electrical contacts fitted.
Figure 15:
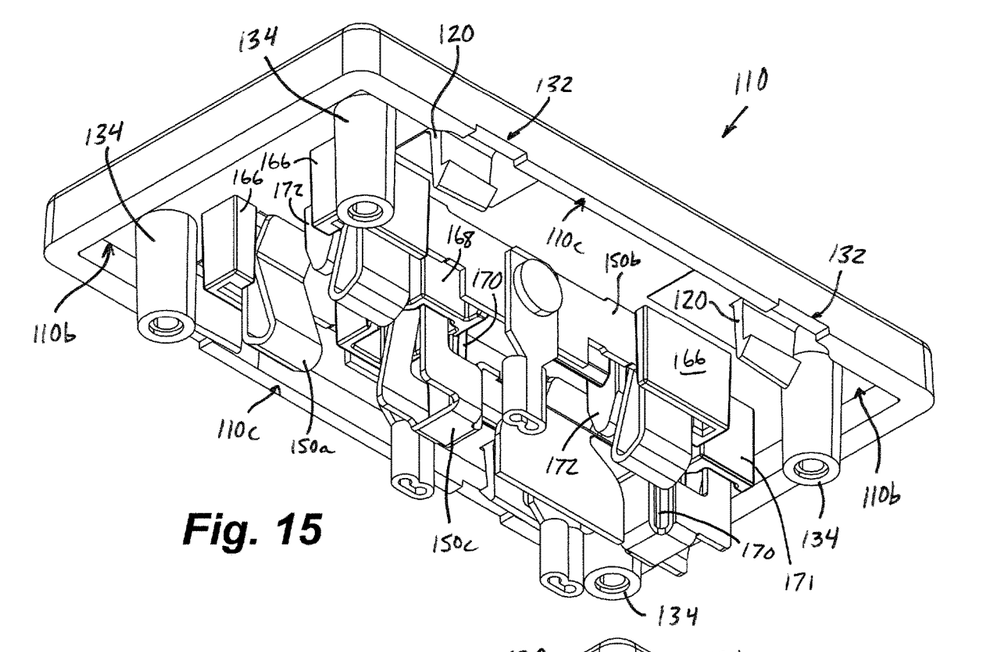
FIG. 15 is an upper-rear-right perspective view of the front housing piece with electrical contacts fitted.
Figure 16:
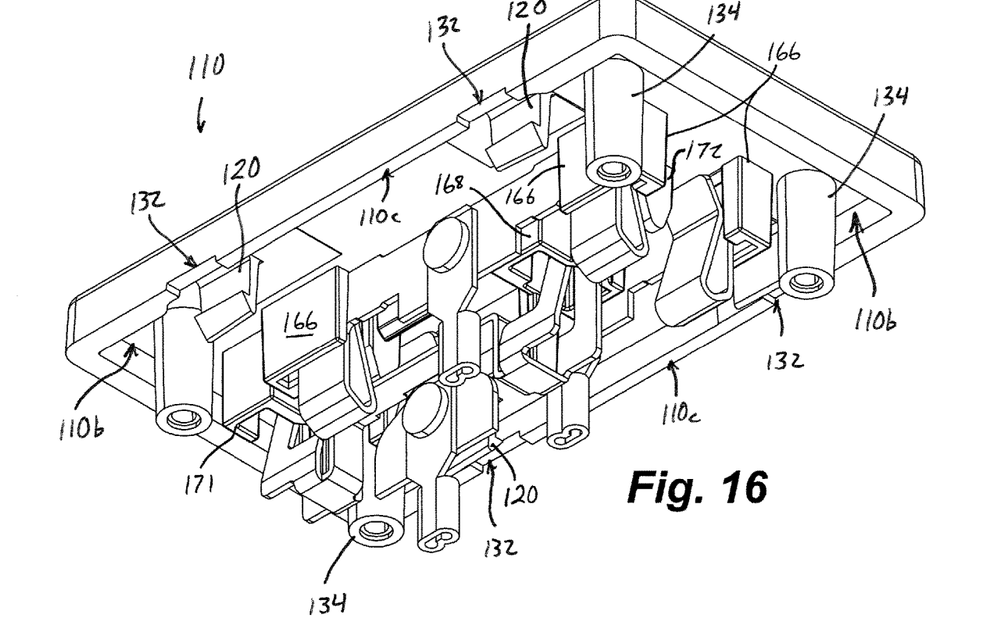
FIG. 16 is an upper-rear-left perspective view of the front housing piece with electrical contacts fitted.
Figure 17:
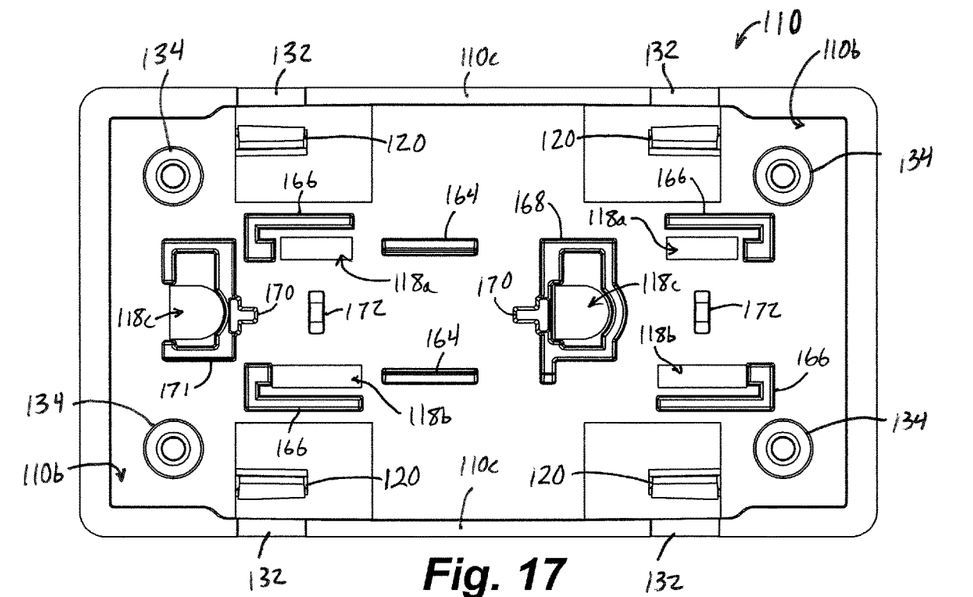
FIG. 17 is a rear elevation view of the front housing piece.
Figure 18:
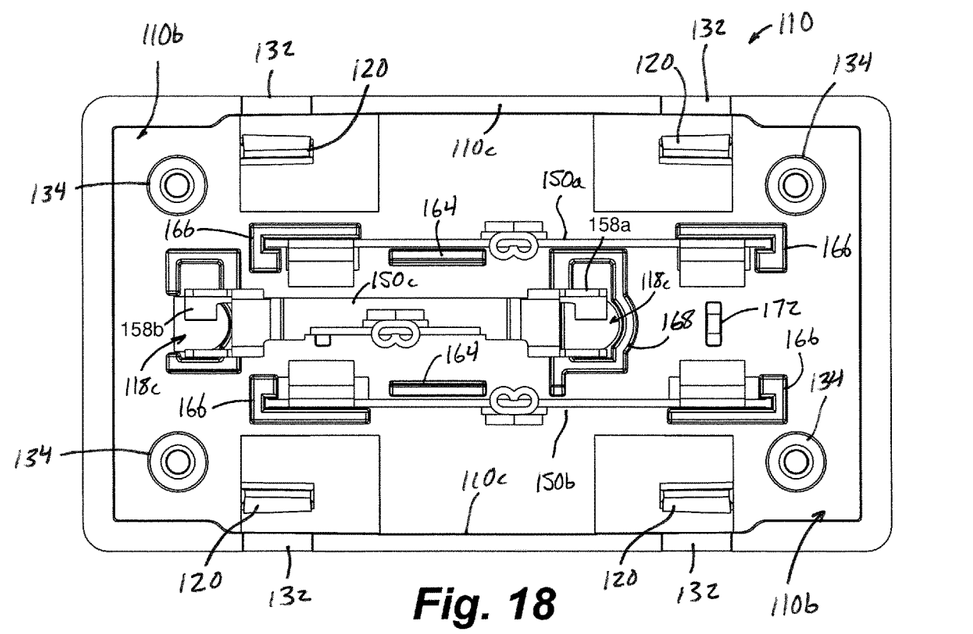
FIG. 18 is a rear elevation view of the front housing piece with electrical contacts fitted.

In order to position and support a line bus bar 150a, a neutral bus bar 150b, and a ground bus bar 150c, both during assembly and once the housing portions 108, 110, 112 are assembled and secured together, an interior forward-facing region of rear housing portion 112 includes a plurality of forward-extending walls or ribs 152 and posts 154 to provide positioning aids and support for bus bars 150a-c, such as shown in FIGS. 9 and 11-14. A longer ground support post 156 provides added lateral support for an upper ground terminal 158a of ground bus bar 150c, as shown in FIGS. 11, 12, and 14, to maintain adequate pressure of ground terminal 158 against a ground prong 160c of an electrical plug 162 (FIGS. 7 and 8) that may be used to supply electrical power to cord 106. Electrical plug 162 also includes a line prong 160a and neutral prong 160b, which are in electrical communication with line bus bar 150a and neutral bus bar 150b, respectively.

Figure 20:
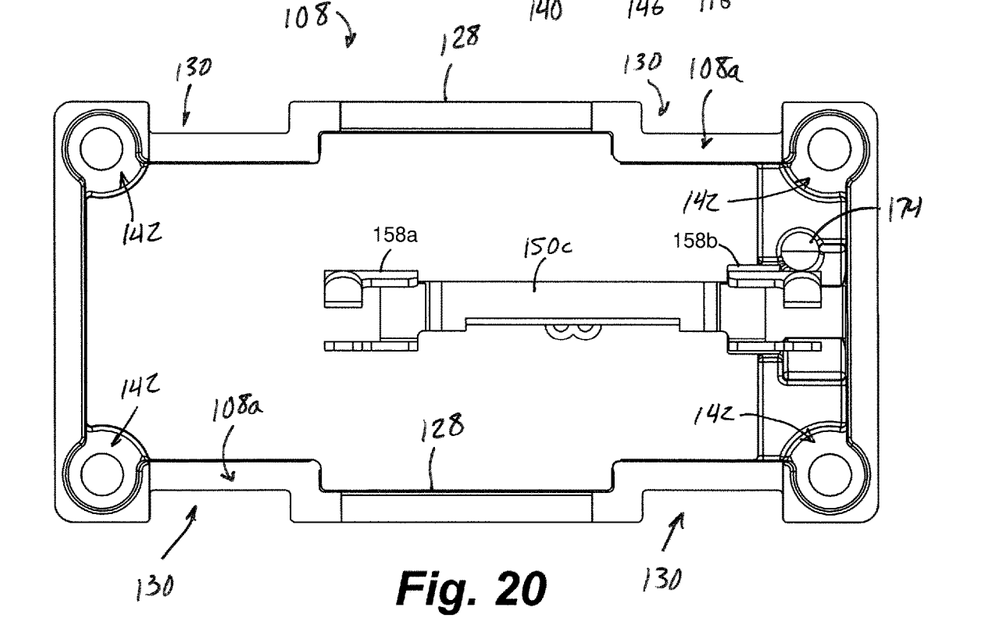
FIG. 20 is a rear elevation view of the perimeter housing piece with ground contact fitted.

Referring to FIGS. 10 and 15-18, front housing portion 110 includes a plurality of rearwardly-extending projections including flat walls 164 along a central region, a J-shaped wall 166 at each of the line contact openings 118a and neutral contact openings 118b, an enclosure wall 168 at an upper ground contact opening 118c, a C-shaped enclosure wall 171 at a lower ground contact opening 118c, a pair of T-shaped posts 170, and a pair of flat posts 172. Enclosure wall 168 is sized and positioned to receive both the upper ground contact 158a and the longer ground support post 156 of rear housing portion 112, while C-shaped enclosure wall 171 is sized and positioned to receive both a lower ground contact 158b and the lower ground support post 174 of perimeter housing portion 108. As can be seen in the drawings, the various rearwardly-extending projections provide further positioning aids and support for line bus bar 150a, neutral bus bar 150b, and ground bus bar 150c, including maintaining alignment of their respective contacts with contact openings 118a-c in front housing portion 110, both during assembly and once the housing portions 108, 110, 112 are assembled and secured together. Perimeter housing portion 108 includes a lower ground support post 174 positioned at interior 116, near strain relief projection 124, and extending in a forward direction as shown in FIGS. 9 and 20. Similar to ground support post 156, lower ground support post 174 provides lateral support for the lower ground terminal 158b of ground bus bar 150c, as shown in FIG. 20.

It will be appreciated that difference electrical power plugs can be accommodated simply by substituting different electrical bus bars and a different front housing portion having a different arrangement of electrical outlet openings. To provide a desired level of support for different electrical bus bars, however, it may be desirable to also provide rear and/or perimeter housing portions with different configurations of support walls and posts in order to accommodate bus bars of different shapes and with different positions of electrical contacts. In addition, it may be desirable to enlarge the housing components and/or provide shorter bus bars in order to accommodate one or more low voltage DC electrical power outlets (e.g., 2V DC to 12V DC) in addition to (or instead of) high voltage AC electrical power outlets. Optionally, the outlet housing may be configured to accommodate only low voltage DC electrical power outlets and/or data outlets.

Therefore, the electrical outlet of the present invention has a three-piece housing that is particularly strong, easy to assemble, does not require a separate electrical box, and can be installed and removed either with no tools, or with only basic tools. The outlet may be supplied with electrical power from a conventional plug, or from a hard-wired or modular connector arrangement, as desired. The outlet housing provides substantial support for the electrical bus bars and associated contacts contained in the housing interior, so that the contacts resist plastic deformation over long periods of use, maintaining frictional resistance to pull-out forces applied to a plug, and improving durability.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical outlet comprising:
   a perimeter housing portion defining an interior and having a front edge and a rear edge;
   a front housing portion having a rear surface configured for engagement with said front edge of said perimeter housing portion, said front housing portion defining an electrical receptacle opening to said interior, and a plurality of rearwardly-extending latch tabs for securing said electrical outlet to a mounting surface; and
   a rear housing portion having a front surface configured for engagement with said rear edge of said perimeter housing portion;
   wherein said rear housing portion and said perimeter housing portion cooperate to define a strain relief configured to engage an electrical cord that enters said interior from an exterior of said electrical outlet.

2. The electrical outlet of claim 1, wherein said strain relief comprises:
   a strain relief projection extending rearwardly from said rear edge of said perimeter housing portion, said strain relief projection having an arcuate recess at a rear end portion thereof; and
   a strain relief recess extending rearwardly from said front surface of said rear housing portion, said strain relief recess defining a concave recess at a rear end portion thereof;
   wherein, upon assembly of said perimeter housing portion to said rear housing portion, said strain relief recess receives said strain relief projection and said arcuate recess cooperates with said concave recess to form an opening for the electrical cord.

3. The electrical outlet of claim 1, wherein said perimeter housing portion comprises a pair of opposing sidewalls each defining a recess, and wherein said rearwardly-extending latch tabs are received in said recesses when said front housing portion is assembled to said perimeter housing portion.

4. The electrical outlet of claim 1, wherein said front housing portion comprises a plurality of screw bosses extending rearwardly into said perimeter housing portion, and said rear housing portion defines a plurality of fastener openings aligned with respective ones of said screw bosses, said electrical outlet comprising a plurality of threaded screws passing through said fastener openings and threadedly engaging said screw bosses to secure said front housing portion to said rear housing portion with said perimeter housing portions secured therebetween.

5. The electrical outlet of claim 4, wherein said perimeter housing portion defines a plurality of fastener passageways configured to receive respective ones of said screw bosses and said threaded screws.

6. The electrical outlet of claim 5, wherein said front surface of said rear housing portion comprises a plurality of forward-extending annular walls that are received in said fastener passageways of said perimeter housing portion.

7. The electrical outlet of claim 1, wherein:
said rear surface of said perimeter housing portion comprises a plurality of rearwardly-extending alignment tabs and a plurality of forwardly-extending alignment recesses;
said front surface of said rear housing portion comprises a plurality of forwardly-extending alignment tabs and a plurality of rearwardly-extending alignment recesses;
said rearwardly-extending alignment tabs of said perimeter housing portion are received in said rearwardly-extending alignment recesses of said rear housing portion; and
said forwardly-extending alignment recesses of said perimeter housing portion receive said forwardly-extending alignment tabs of said rear housing portion.

8. The electrical outlet of claim 1, further comprising a plurality of electrical bus bars supported between said front and rear housing portions, said electrical bus bars each having an electrical contact aligned with a respective one of a plurality of said electrical receptacle openings.

9. The electrical outlet of claim 8, wherein said plurality of electrical bus bars comprise an electrical ground bus bar with ground contact, and wherein said perimeter housing portion comprises a forwardly-extending ground support post configured to support said electrical ground contact.

10. The electrical outlet of claim 8, wherein said rear housing portion comprises a plurality of forwardly-extending walls and posts configured to support said plurality of electrical bus bars in alignment with said electrical openings and in electrical isolation from one another.

11. The electrical outlet of claim 10, wherein said front housing portion comprises a plurality of rearwardly-extending walls configured to support said plurality of electrical bus bars in alignment with said electrical openings and in electrical isolation from one another.

12. The electrical outlet of claim 11, wherein said plurality of electrical bus bars comprise an electrical ground bus bar with ground contact, and wherein said rear housing portion comprises a forwardly-extending ground support post configured to support said electrical ground contact.

13. The electrical outlet of claim 12, wherein said forwardly-extending ground support post comprises a forward tip portion received in a ground receptacle wall of said plurality of rearwardly-extending walls of said front housing portion.

14. The electrical outlet of claim 11, wherein said plurality of electrical bus bars comprise an electrical ground bus bar having upper and lower ground contacts, said rear housing portion comprises a forwardly-extending post configured to support said upper ground contact, and said perimeter housing portion comprises a forwardly-extending post configured to support said lower electrical ground contact.

15. An electrical outlet comprising:
a perimeter housing portion defining an interior and having a front edge and a rear edge;
a front housing portion having a rear surface configured for engagement with said front edge of said perimeter housing portion, and said front housing portion defining a plurality of electrical receptacle openings to said interior;
a rear housing portion having a front surface configured for engagement with said rear edge of said perimeter housing portion; and
a plurality of electrical bus bars supported between said front and rear housing portions, said electrical bus bars each having an electrical contact aligned with a respective one of said electrical receptacle openings;
wherein said rear housing portion comprises a plurality of forwardly-extending walls and posts configured to support said plurality of electrical bus bars in alignment with said electrical openings and in electrical isolation from one another; and
wherein said front housing portion comprises a plurality of rearwardly-extending walls configured to support said plurality of electrical bus bars in alignment with said electrical openings and in electrical isolation from one another.

16. The electrical outlet of claim 15, wherein said plurality of electrical bus bars comprise an electrical ground bus bar with ground contact, and wherein said rear housing portion comprises a forwardly-extending post configured to support said electrical ground contact.

17. The electrical outlet of claim 16, wherein said forwardly-extending post comprises a forward tip portion received in a ground receptacle wall of said plurality of rearwardly-extending walls of said front housing portion.

18. The electrical outlet of claim 15, wherein said plurality of electrical bus bars comprise an electrical ground bus bar with ground contact, and wherein said perimeter housing portion comprises a forwardly-extending post configured to support said electrical ground contact.

19. The electrical outlet of claim 15, wherein said plurality of electrical bus bars comprise an electrical ground bus bar having upper and lower ground contacts, said rear housing portion comprises a forwardly-extending post configured to support said upper ground contact, and said perimeter housing portion comprises a forwardly-extending post configured to support said lower electrical ground contact.

20. The electrical outlet of claim 15, wherein said front housing portion comprises a plurality of rearwardly-extending latch tabs for securing said electrical outlet to a mounting surface, said perimeter housing portion comprises a pair of opposing sidewalls each defining a recess, and wherein said rearwardly-extending latch tabs are received in said recesses when said front housing portion is assembled to said perimeter housing portion.

* * * * *